United States Patent [19]
Komine

[11] Patent Number: 5,975,817
[45] Date of Patent: Nov. 2, 1999

[54] TOOL HOLDER

[75] Inventor: Tsuyoshi Komine, Tuna-gun, Japan

[73] Assignee: Big Alpha Co., Ltd., Hyogo, Japan

[21] Appl. No.: 09/058,201

[22] Filed: Apr. 10, 1998

[30] Foreign Application Priority Data

Dec. 16, 1997 [JP] Japan .................................. 9-346602

[51] Int. Cl.$^6$ .................................................. B23B 51/06
[52] U.S. Cl. .......................... 409/136; 279/20; 408/57; 408/59; 408/61
[58] Field of Search .............................. 279/20, 52, 903; 408/56, 57, 59, 61; 409/136, 234

[56] References Cited

U.S. PATENT DOCUMENTS

| | | | |
|---|---|---|---|
| 3,421,392 | 1/1969 | Bangerter et al. | 408/57 |
| 4,320,999 | 3/1982 | Briese | 408/59 |
| 4,955,764 | 9/1990 | Reinauer | 408/57 |
| 5,340,127 | 8/1994 | Martin | 408/57 |
| 5,405,155 | 4/1995 | Kanaan et al. | |
| 5,567,093 | 10/1996 | Richmond | 408/57 |

FOREIGN PATENT DOCUMENTS

| | | | |
|---|---|---|---|
| 0 781 616 | 7/1997 | European Pat. Off. | |
| 2239849 | 2/1975 | France | 408/56 |
| 6-277916 | 10/1984 | Japan . | |
| 249517 | 12/1985 | Japan | 279/20 |
| 1-170531 | 12/1989 | Japan . | |
| 4-102709 | 9/1992 | Japan . | |
| 5-24214 | 3/1993 | Japan . | |
| 6-27046 | 4/1994 | Japan . | |
| 7-051982 | 2/1995 | Japan . | |
| 7-17452 | 3/1995 | Japan . | |
| 7-18515 | 5/1995 | Japan . | |
| 7-40009 | 7/1995 | Japan . | |

OTHER PUBLICATIONS

European Search Report.

*Primary Examiner*—Daniel W. Howell
*Attorney, Agent, or Firm*—Sixbey Friedman Leedom & Ferguson; Thomas W. Cole

[57] ABSTRACT

The present invention provides a tool holder which realizes an improved applicability to tools with different diameters and attains high sealability and is capable of efficiently supplying a fluid at a predetermined position even when a fluid of high pressure is supplied. The tool holder comprises: an engaging member 4 provided on the top end side of a tool holding portion of a holder body 2 and comprising an inclined face 15 constructed in a manner such that the inside diameter becomes smaller toward the top end of the tool 10 held by the holder body 2; and an elastic member 5 as a stopper provided between the inclined face 15 and the outside periphery of the tool 10.

19 Claims, 10 Drawing Sheets

TOOL HOLDER

BACKGROUND OF THE INVENTION

1. Field of the Invention

The present invention relates to a tool holder. More particularly, this invention relates to a tool holder capable of supplying a fluid such as a coolant to a processing site between a tool tip and an article to be processed.

2. Description of the Related Art

Upon processing of articles by means of tools such as drilling and milling machines, various tool holders have been conventionally used which are capable of supplying fluids such as coolants at a processing site between the tip of a tool and an article to be processed.

An example of such a tool holder is disclosed in the official gazette of the Japanese Utility Model Laid-Open (Kokai) Publication No. HEI 7-17452. This tool holder is constructed in a manner such that it comprises: a holder body with a coolant passage formed therein; a collet to be mounted at the inside diameter portion of the holder body; a nut screwed at the holder body and for fixing the collet; and a nozzle disk provided between the nut and the tool and having a plurality of nozzle holes opened toward the tip of the top end of the tool or a clearance formed to provide a predetermined space from the outside peripheral portion of the tool.

This tool holder is constructed in a manner such that a coolant supplied into the coolant passage of the holder body will pass through the inside diameter portion of the holder body and slittings of the collet and will jet out of the plurality of nozzle holes or the clearance between the tool and the nozzle disk toward the tip of the tool.

With this tool holder, an O ring is provided, as a sealing member for preventing leakage of the coolant, at the back end of an engagement portion of the nut with the nozzle disk and between the tool and the nozzle disk.

Generally, there are various kinds of tools with regard to the shape of blades and the size, and processing conditions variedly differ depending on the shape or processing depth of an article to be processed. Regarding the tool holder as disclosed in the above-mentioned official gazette, if tools with different diameters are used, the tool holder will not be able to adjust to such tools and there is a possibility that the coolant might leak from between the tool and the nozzle disk. There is also a problem in that the sealability of the tool holder is weak for the supply of a coolant of high pressure.

In addition to the above-mentioned official gazette, examples of a conventional tool holder (device for supplying fluids to a tool) are disclosed in the Japanese Patent Laid-Open (Kokai) Publication No. HEI 7-51982, the Japanese Patent Laid-Open (Kokai) Publication No. HEI 6-277916, the Japanese Utility Model Laid-Open (Kokai) Publication No. HEI 6-27046, the Japanese Utility Model Laid-Open (Kokai) Publication No. HEI 1-170531 and the Japanese Utility Model (Kokoku) Publication No. HEI 7-18515. Regarding any of these tool holders, adaptability to tools with different diameters and an improvement of sealability upon supply of a coolant of high pressure are not properly taken into consideration.

SUMMARY OF THE INVENTION

The present invention aims at solving the above-mentioned conventional problems. It is an object of this invention to provide a tool holder which realizes an improved applicability to tools with different diameters and attains a high level of sealability and is capable of efficiently supplying a fluid at a predetermined position even when the fluid of high pressure is supplied.

In order to attain the above-described object, this invention provides a tool holder for holding a tool and for supplying to the held tool a fluid passing within a holder body from its base end side toward its top end side. This tool holder comprises: an engaging member provided on the top end side of a tool holding portion of a holder body and comprising an inclined face constructed in a manner such that an inside diameter becomes smaller toward the top end of the held tool; and a stopper provided between the inclined face and the outside periphery of the held tool.

The stopper may be composed of an elastic member.

With the tool holder having the above-described construction, the space formed between the inclined face and the held tool becomes narrower toward the top end side of the tool because of the existence of the inclined face. Accordingly, as the stopper is moved by pressure of the fluid to the top end side of the tool, the stopper will be pressed relatively in its shaft center direction because of the existence of the inclined face and will be caused to contract. Therefore, the stopper will become in close contact with the tool and with the engaging member. This action improves as the pressure of the fluid becomes higher, thereby realizing higher sealability.

Even if the diameter of a tool to be held varies, the movement of the stopper will attain high sealability.

The stopper can be formed in a shape complementary to the inclined face and the outside periphery of the tool.

The base end face of the stopper that receives pressure from the fluid can be formed in a convex shape. Moreover, the base end face of the stopper that receives pressure from the fluid can be formed in a concave shape.

The inside diameter of the stopper on the side receiving pressure from the fluid can be made smaller than that on the top end side of the tool.

A fold can be provided on the inside peripheral surface of the stopper in a manner such that the inside diameter of the stopper becomes smaller toward the side receiving pressure from the fluid. A plurality of such folds may be provided. The existence of the fold(s) lowers elasticity and, therefore, makes it possible to insert tools with different diameters smoothly.

Among the plurality of the folds, the fold on the top end side of the tool can be provided in a manner such that the inside diameter of the stopper becomes smaller toward the top end side of the tool. The folds can prevent foreign materials from infiltrating from outside.

A supply passage for supplying the fluid, which pierces from the side receiving pressure from the fluid through the top end side of the tool, can be formed at a desired position of the stopper. The supply passage can be composed of a groove provided at a desired position on the inside peripheral surface of the stopper. Moreover, the supply passage can be formed between the inside peripheral surface of the stopper and the outside peripheral surface thereof.

A wall capable of engaging with the stopper can be provided on the inside peripheral surface of the engaging member on the holder body side.

The engaging member can be constructed to be separable from the holder body.

The engaging member can be provided on a nut for fastening and fixing the tool at the holder body. In this case, the engaging member may be provided on a nut for a collet chuck or on a nut for a needle lock chuck. Moreover, the engaging member may be provided on a nut for a side lock holder or on a nut for a morse taper holder.

DESCRIPTION OF THE PREFERRED EMBODIMENTS

A tool holder according to embodiments of this invention is hereinafter explained with reference to drawings.
[Embodiment 1]

Figure 1:
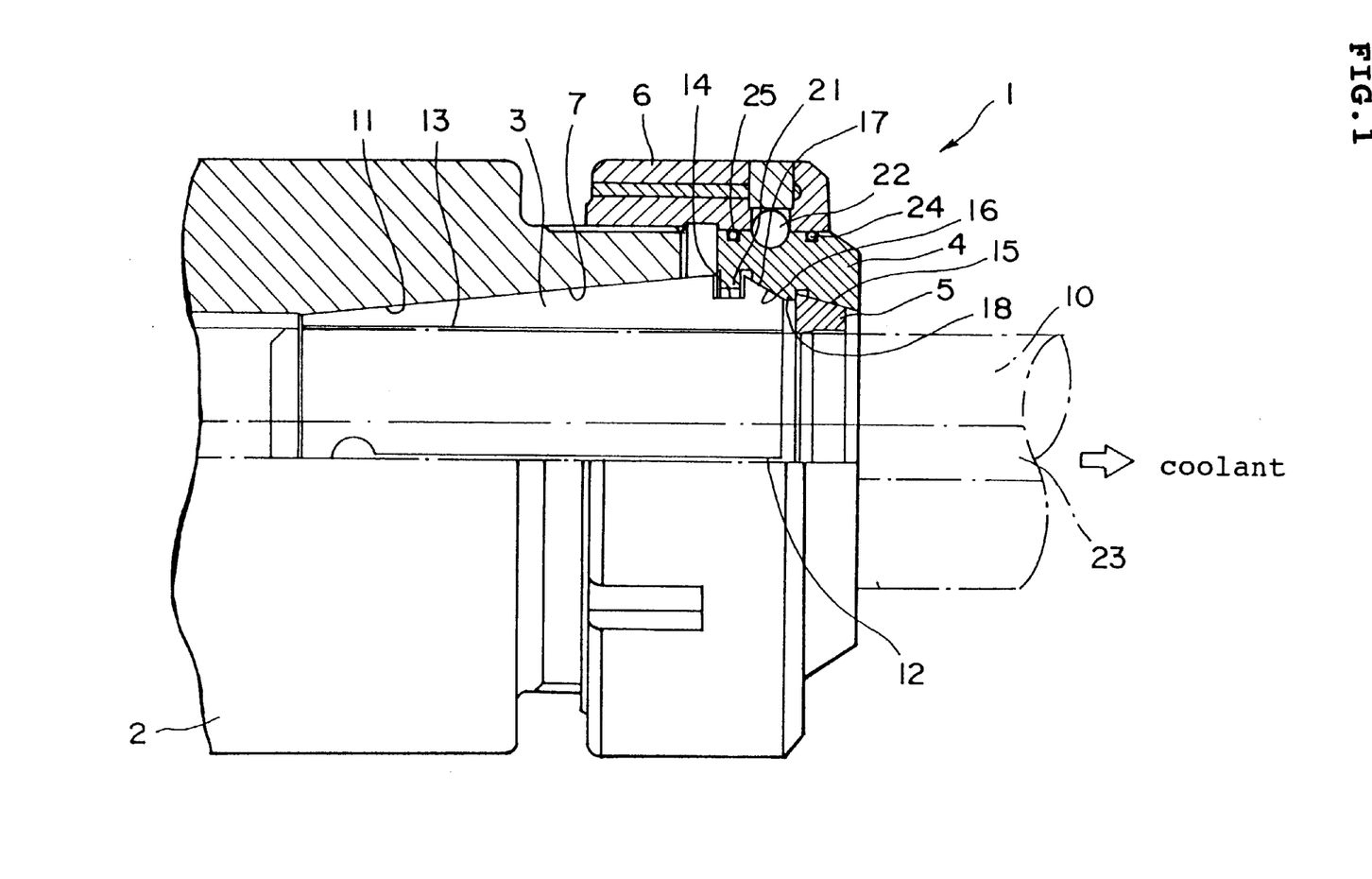
FIG. 1 is a partial sectional view of a tool holder according to Embodiment 1 of the present invention.
Figure 2:
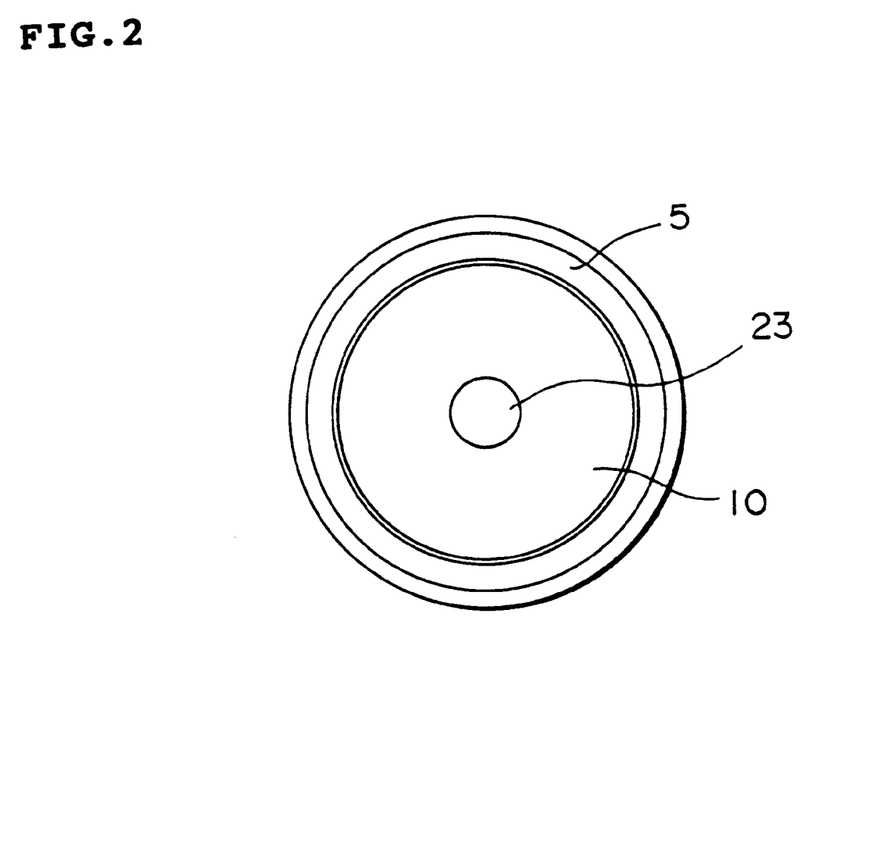
FIG. 2 is a front view of a part of the tool holder, as shown in FIG. 1, at which a tool is fixed.

FIG. 1 is a partial sectional view of a tool holder according to Embodiment 1 of the present invention. FIG. 2 is a front view of a part of the tool holder, as shown in FIG. 1, at which a tool is fixed. In all the embodiments hereinafter described, the side of the tool holder where a tool is held is referred to as a "top end side" and the side of the tool holder where a coolant is supplied is referred to as a "base end side."

As shown in FIGS. 1 and 2, a tool holder 1 according to Embodiment 1 is constructed in a manner such that it comprises: a holder body 2; a collet 3 placed within the holder body 2; an engaging member 4 mounted on the top end side of a tool holding portion of the holder body 2; an elastic member 5 functioning as a stopper and provided between the engaging member 4 and the outside periphery of a tool 10 held by the holder body 2; and a nut 6 for fastening and fixing the tool 10 at the holder body 2. This tool holder is a so-called "center through type."

The holder body 2 has a coolant supply hole (not shown) at its shaft center. The top end side of this coolant supply hole is a receiving hole 11 for receiving the collet 3 and the tool 10. A collet receiving portion 7 of the receiving hole 11 for receiving the collet 3 is constructed in a manner such that the diameter becomes gradually larger toward the top end side.

The collet 3 is constructed in a manner such that the portion of the holder body 2 to be received by the collet receiving portion 7 is formed in a shape complementary to the shape of the collet receiving portion 7, so that the diameter on the top end side is larger than the diameter on the base end side. A concave engaging portion 14 to engage with a convex engaging portion 21 of the engaging member 4 described later is formed along the outside periphery near the top end side of the collet 3. Moreover, at an area extending from the concave engaging portion 14 of the collet 3 toward the top end side, an inclined face 16 is formed so that the diameter becomes gradually smaller toward the top end side.

This collet 3 has slittings 12 and 13 which are long in the axial direction and are formed in order to enable contraction in the radial direction. The slitting 12 is open on the top end side of the collet 3 and the slitting 13 is open on the base end side of the collet 3. These slittings 12 and 13 are located alternately at regular intervals in the circumferential direction of the collet 3.

The engaging member 4 is composed of an annular member provided on the top end side of the holder body 2. At the top end portion of the inside peripheral surface of the engaging member 4, an inclined face 15 is formed so that the inside diameter becomes gradually smaller toward the top end. At the base end of the engaging member 4, the convex engaging portion 21 to engage with the concave engaging portion 14 of the collet 3 is formed and protrudes toward the shaft center and along the inside peripheral surface. An inclined face 17 is formed between the convex engaging portion 21 and the inclined face 15 and contacts the inclined face 16 formed on the top end side of the collet 3.

Moreover, a wall 18 protruding toward the shaft center is formed between the inclined face 15 of the engaging member 4 and the inclined face 17 and along the inside peripheral surface. This wall 18 engages with the elastic member 5 described later in detail.

The elastic member 5 as a stopper is capable of intervening between the outside periphery of the tool 10 received by the collet 3 and the inclined face 15 of the engaging member 4, and the elastic member 5 is formed in an annular shape which enables complementation to the space formed by the inclined face 15 and the outside periphery of the held tool 10. In other words, it is constructed in a manner such that the outside diameter on the top end side becomes smaller than the outside diameter on the base end side. Moreover, it is constructed in a manner such that the inside diameter on the top end side becomes slightly smaller than the outside diameter on the top end side. The base end side of the outside peripheral surface of the elastic member 5 engages with the wall 18 of the engaging member 4.

According to Embodiment 1, the portion for receiving pressure from a coolant, i.e., the end face on the base end side is formed to be flat.

Various materials such as rubber can be listed as a material for composing the elastic member 5. However, such a material is not specifically limited as long as the elastic member 5 can be used as a sealing member for the tool holder.

The nut 6 is a fastening member for fastening the collet 3, which holds the tool 10, in the radial direction and for fixing the tool 10 at the holder body 2 and is mounted in a manner such that it is freely relatively rotatable against the outside peripheral surface of the engaging member 4 through an intermediary of a ball 22 for connection. Rotation of the nut 6 presses the engaging member 4 and the holder body 2 in their radial direction and then similarly compresses the collet 3 in the radial direction, thereby fixing the tool 10.

The tool 10 has a through hole 23 at its central portion along the shaft center. This through hole 23 is for letting a coolant pass through. As a coolant supplied from the base end side of the holder body 2 passes through, the coolant can be supplied to a desired position such as a processing site between the tip of the tool 10 and an article to be processed. Moreover, annular sealing members 24 and 25 are provided between the nut 6 and the engaging member 4.

Specific motions of the tool holder 1 according to Embodiment 1 are hereinafter described.

First, the tool 10 is inserted into the tool holder 1 and the nut 6 is rotated in a desired direction to compress the outside peripheral surface of the collet 3 and to make the diameter of the collet 3 contract, thereby fixing the tool 10 at the tool holder 1.

Since the diameter of the outside periphery of the tool 10 is slightly larger than the diameter of the inside periphery of the elastic member 5, the elastic member 5 contacts the outside periphery of the tool 10, thereby sealing the inside peripheral surface of the elastic member 5 and the outside peripheral surface of the tool 10. Moreover, the elastic member 5 contacts the wall 18 formed over the inside peripheral surface of the engaging member 4 on the base end side, thereby sealing the outside peripheral surface of the elastic member 5 and the inside peripheral surface of the engaging member 4.

When a coolant is supplied at high pressure, the elastic member 5 moves toward the top end side and then contacts the inclined face 15, thereby sealing the outside peripheral surface of the elastic member 5 and the inside peripheral surface of the engaging member 4.

When the diameter of the tool is slightly large, the tool can be mounted smoothly because the elasticity of the folds is low. When the tool becomes larger, the tool extends the elastic member 5 and contacts the wall 18 and the inclined face 15 formed on the inside peripheral surface of the engaging member 4 on its base end side.

The above-described operations disconnect the inside of the tool holder 1 from the outside thereof so that the coolant supplied from a coolant supply hole (not shown) formed on the base end side of the holder body 2 to the collet 3 and the through hole 23 of the tool 10 will leak not out from other than the through hole 23.

For example, even if the diameter of the tool 10 is smaller than that of a tool normally used and the inside peripheral surface of the elastic member 5 is not in contact with the outside peripheral surface of the tool 10, the supply pressure of the coolant moves the elastic member 5 toward the top end side and presses the elastic member 5 relatively against the inside peripheral surface of the engaging member 4 so that the elastic member 5 contracts in the shaft center direction, thereby causing the elastic member 5 to contact the tool 10. Accordingly, the tool holder according to this invention can be used for tools 10 with different diameters even beyond the range of inside diameter elasticity of the elastic member 5.

At this time, the elastic member 5 also closely contacts the inclined face 15 of the engaging member 4. Therefore, high sealability can be obtained. The higher the supply pressure of the coolant is, the more effectively this action can take place. As a result, if the coolant is supplied at high pressure, high sealability can be obtained. The larger the area of the portion of the elastic member 5 that receives pressure from the coolant is, the more effectively this action can take place.

Accordingly, it is possible to supply the coolant efficiently at a desired position, such as a processing site between the tip of the tool 10 and an article to be processed, during the processing of the article to be processed.

The structure of the elastic member 5 is not limited to the aforementioned structure as long as the elastic member 5 intervenes between the inclined face 15 of the engaging member 4 and the held tool 10 and is capable of performing its sealing function. The elastic member 5 may comprise, for example, the structures as shown in FIGS. 3 through 6.

FIGS. 3 through 6 show sectional shapes of the elastic member, and the left side of the drawings is the aforementioned "base end side" and the right side of the drawings is the aforementioned "top end side."

Figure 3:
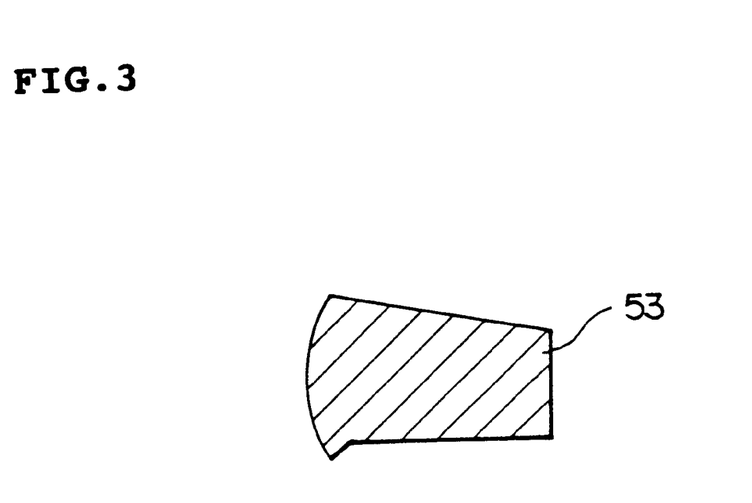
FIG. 3 is a sectional view of another elastic member according to this invention.

The elastic member 53 shown in FIG. 3 is different from the elastic member 5 according to Embodiment 1 in that the portion receiving pressure from the coolant, that is, the base end side surface is shaped in a rounded convex. By providing such a structure, it is possible to enlarge the area of the portion of the elastic member 53 which receives pressure from the coolant.

Figure 4:
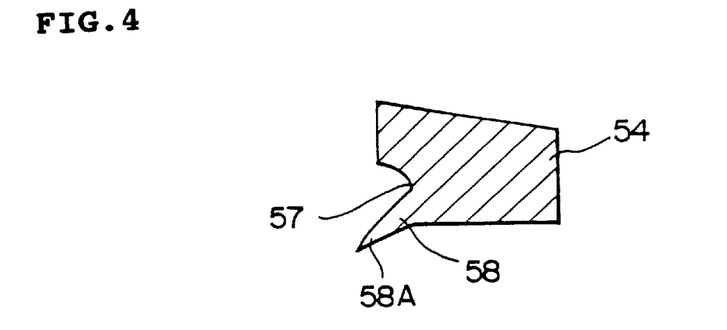
FIG. 4 is a sectional view of another elastic member according to this invention.

The elastic member 54 shown in FIG. 4 is different from the elastic member 5 according to Embodiment 1 in that a concave portion 57 is formed at the portion receiving pressure from the coolant, that is, a generally central portion of the base end side surface and a fold 58 extending toward the base end side is formed on the inside diameter side of the base end side in a manner such that the inside diameter of the elastic member 54 becomes smaller.

This fold 58 is constructed to become thinner toward its top end 58A. By providing such a structure, it is possible to enlarge the area of the portion of the elastic member 54 which receives pressure from the coolant. When placed at the tool 10, the fold 58 is pressed back, because of its elasticity, in the direction of the concave portion 57 and takes the shape complementary to the outside peripheral surface of the tool 10. Moreover, the range of weak elasticity becomes wider and, therefore, it is possible to smoothly mount the tool even when the diameter of the tool varies.

Figure 5:
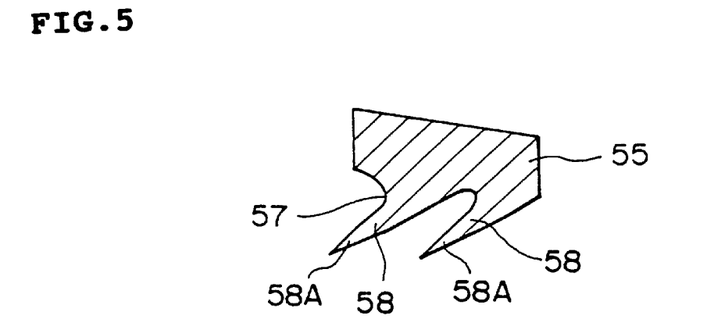
FIG. 5 is a sectional view of another elastic member according to this invention.

The elastic member 55 shown in FIG. 5 is different from the elastic member 54 shown in FIG. 4 in that two folds 58 are provided from the base end side toward the top end side. Three or more folds 58 may be provided from the base end side toward the top end side, and a plurality of folds respectively in different shapes may be provided.

Figure 6:
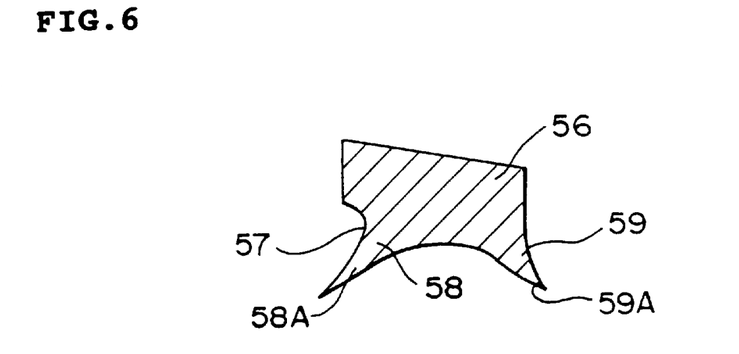
FIG. 6 is a sectional view of another elastic member according to this invention.

The elastic member 56 shown in FIG. 6 is different from the elastic member 53 shown in FIG. 3 in that a fold 59 is also formed on the inside diameter side on the top end side of the elastic member 56. This fold 59 is constructed in a manner such that the inside diameter of the elastic member 56 becomes smaller toward the top end side. The fold 59 is constructed to become thinner toward its top end 59A and, therefore, it is possible to prevent infiltration of foreign materials from the top end side. With the elastic member 56 shown in FIG. 6, a plurality of the folds 58 may be formed as in the case of the elastic member 55 shown in FIG. 5. When placed at the tool 10, the fold 59, similarly to the fold 58, takes the shape complementary to the outside peripheral surface of the tool 10 because of its elasticity.

[Embodiment 2]

The tool holder according to Embodiment 2 of this invention is hereinafter described with reference to the relevant drawings.

Figure 7:
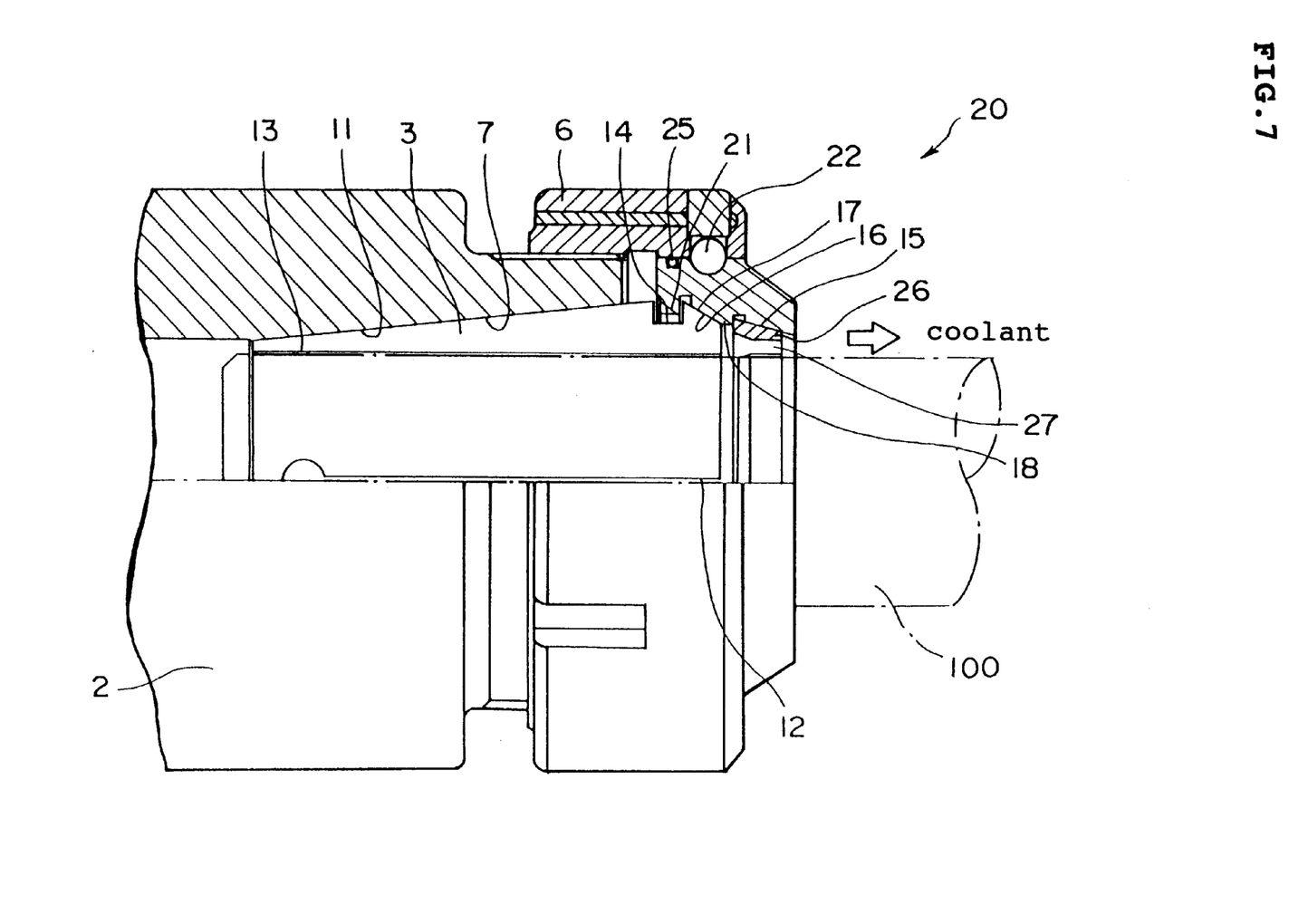
FIG. 7 is a partial sectional view of a tool holder according to Embodiment 2 of this invention.
Figure 8:
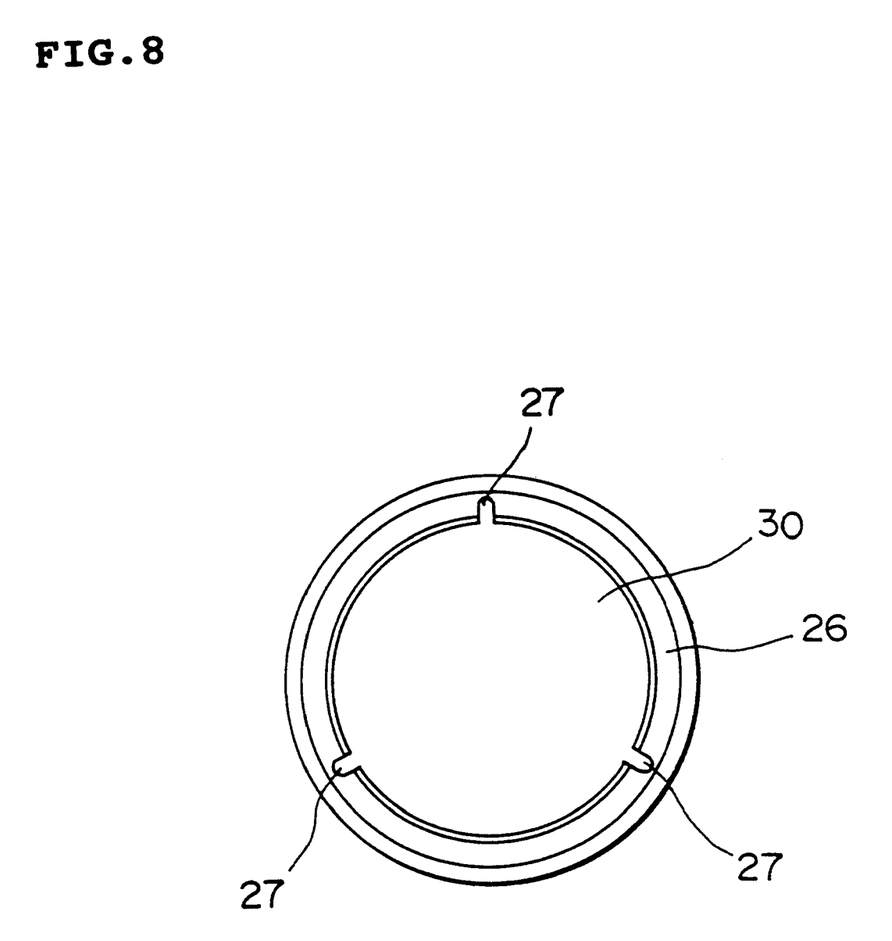
FIG. 8 is a front view of a part of the tool holder, as shown in FIG. 7, at which a tool is fixed.

FIG. 7 is a partial sectional view of a tool holder according to Embodiment 2. FIG. 8 is a front view of a part of the tool holder, as shown in FIG. 7, at which a tool is fixed. Concerning Embodiment 2, members similar to those described in Embodiment 1 are given the same reference numeral and descriptions thereof are omitted.

A tool holder 20 according to Embodiment 2 is different from the tool holder 1 according to Embodiment 1 in the shape of the elastic member and the shape of the tool. The tool holder according to Embodiment 2 is a so-called "nozzle type."

An elastic member 26 of the tool holder 20 according to Embodiment 2 has, on its inside peripheral surface, coolant supply passages 27 pierced through from the base end side to the top end side, which are located at three positions at regular intervals in the circumferential direction. This coolant supply passage 27 is formed in a concave shape from the inside peripheral surface toward the outside peripheral surface.

A tool 100 itself has no through hole formed therein for supplying a coolant and is applied to the so-called "nozzle type" tool holder 20.

When the tool 100 is fixed at the tool holder 20 in the same manner as in Embodiment 1, just as in the case of the tool holder 1 according to Embodiment 1, the outside surface of the tool 100 and the inside peripheral surface of the elastic member 26 are securely sealed and the outside peripheral surface of the elastic member 26 and the inclined face 15 of the engaging member 4 are securely sealed, thereby disconnecting the inside of the tool holder 20 from the outside thereof.

When processing of an article is performed by using the tool 100 fixed at the tool holder 20, the coolant supplied from a coolant supply hole (not shown) formed on the base end side of the holder body into the collet 3 will not leak out from other than the coolant supply hole 27 of the elastic member 26. As a result, it is possible to efficiently supply the coolant at a desired position, such as a processing site between the tip of the tool 100 and the article to be processed, during the processing of the article to be processed.

With the tool holder 20, as in the case of the tool holder 1 according to Embodiment 1, high sealability can be obtained even if the coolant is supplied at high pressure and there is an advantage that the tool holder 20 can be used for tools with different diameters.

Concerning Embodiment 2, an explanation has been given regarding the case where the coolant supply holes 27 are provided at three positions. However, the number of the coolant supply holes 27 to be set is not limited to three, but can be determined as desired.

[Embodiment 3]

A tool holder according to Embodiment 3 of this invention is hereinafter described with reference to the relevant drawings.

Figure 9:
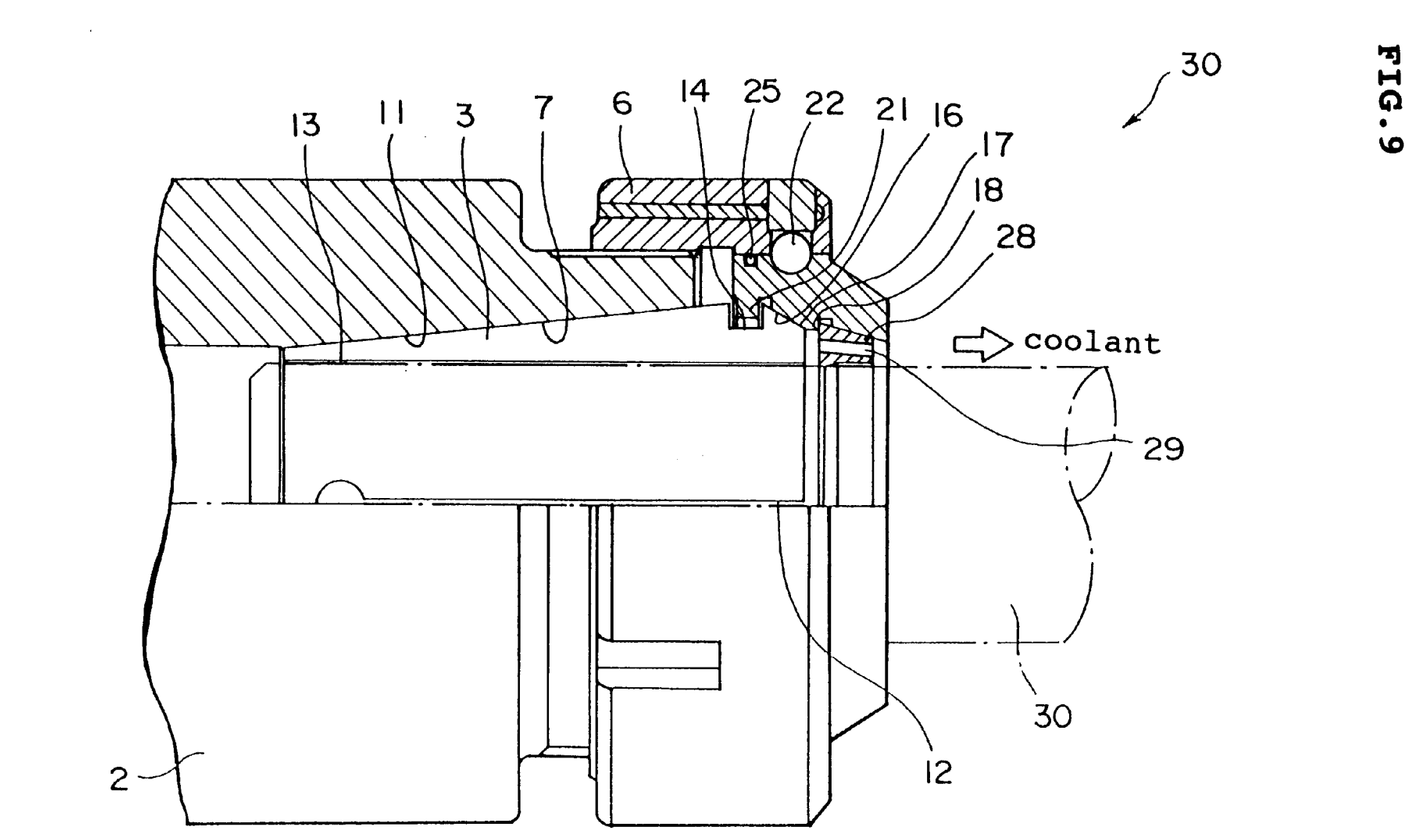
FIG. 9 is a partial sectional view of a tool holder according to Embodiment 3 of this invention.
Figure 10:
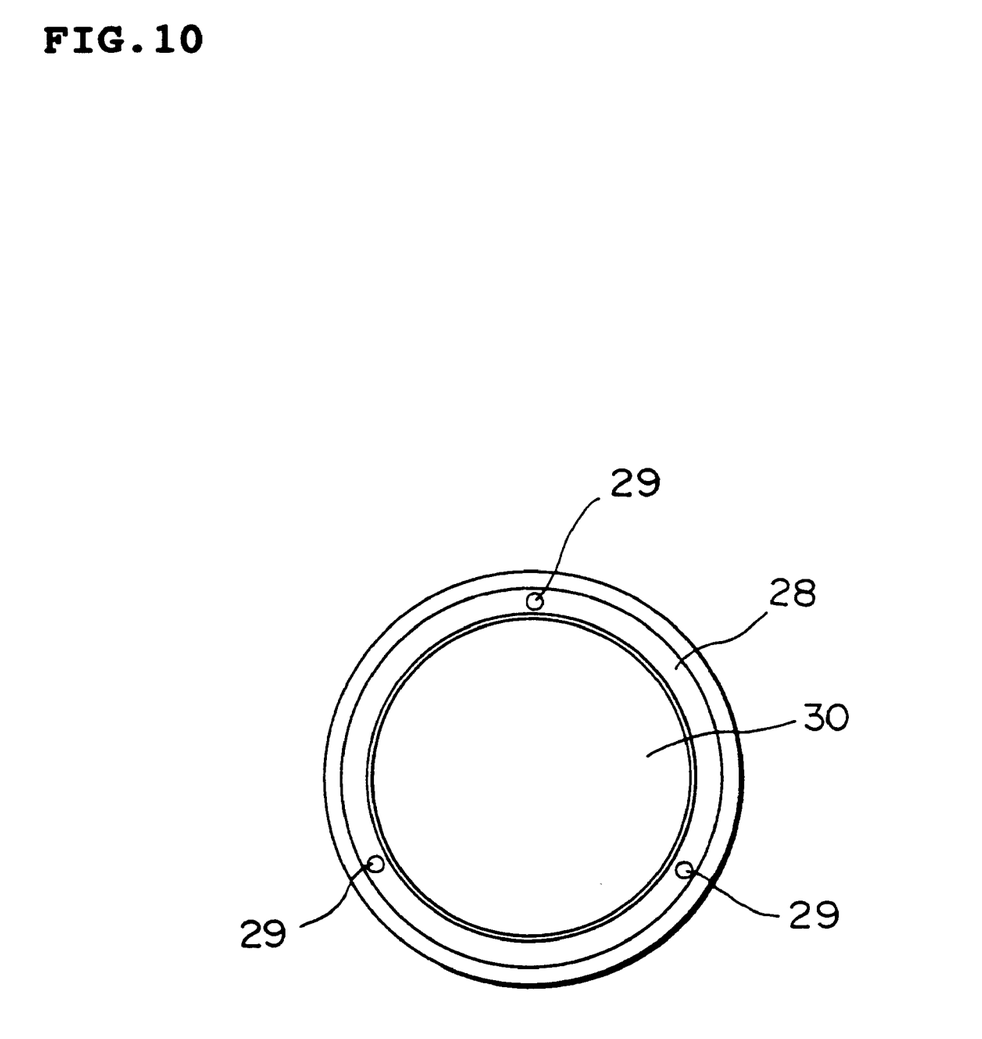
FIG. 10 is a front view of a part of the tool holder, as shown in FIG. 9, at which a tool is fixed.

FIG. 9 is a partial sectional view of a tool holder according to Embodiment 3. FIG. 10 is a front view of a part of the tool holder, as shown in FIG. 9, at which a tool is fixed. Concerning Embodiment 3, members similar to those described in Embodiment 2 are given the same reference numeral and descriptions thereof are omitted.

A tool holder 30 according to Embodiment 3 is different from the tool holder 20 according to Embodiment 2 in the shape of the elastic member. The tool holder according to Embodiment 3 is a so-called "nozzle type."

An elastic member 28 of the tool holder 30 according to Embodiment 3 has, between its inside peripheral surface and its outside peripheral surface, coolant supply passages 29 pierced through from the base end side to the top end side, which are located at three positions at regular intervals in the circumferential direction. This coolant supply passage 29 is formed in a cylindrical long hole shape from the inside peripheral surface toward the outside peripheral surface.

When the tool 100 is fixed at the tool holder 30 in the same manner as in Embodiment 2, just as in the case of Embodiment 2, the inside of the tool holder 30 is disconnected from the outside thereof.

When processing of an article is performed by using the tool 100 fixed at the tool holder 30, the coolant supplied from a coolant supply hole (not shown) formed on the base end side of the holder body 2 into the collet 3 will not leak out from other than the coolant supply hole 29 of the elastic member 28. As a result, it is possible to efficiently supply the coolant at a desired position, such as a processing site between the tip of the tool 100 and the article to be processed, during the processing of the article to be processed.

It is a matter of course that with the tool holder 30, advantages similar to those of the aforementioned embodiments can be obtained.

Concerning Embodiment 3, an explanation has been given regarding the case where the coolant supply holes 29 are provided at three positions. However, the number of the coolant supply holes 29 to be set is not limited to three, but can be determined as desired.

[Embodiment 4]

A tool holder according to Embodiment 4 of this invention is hereinafter described with reference to the relevant drawing.

Figure 11:
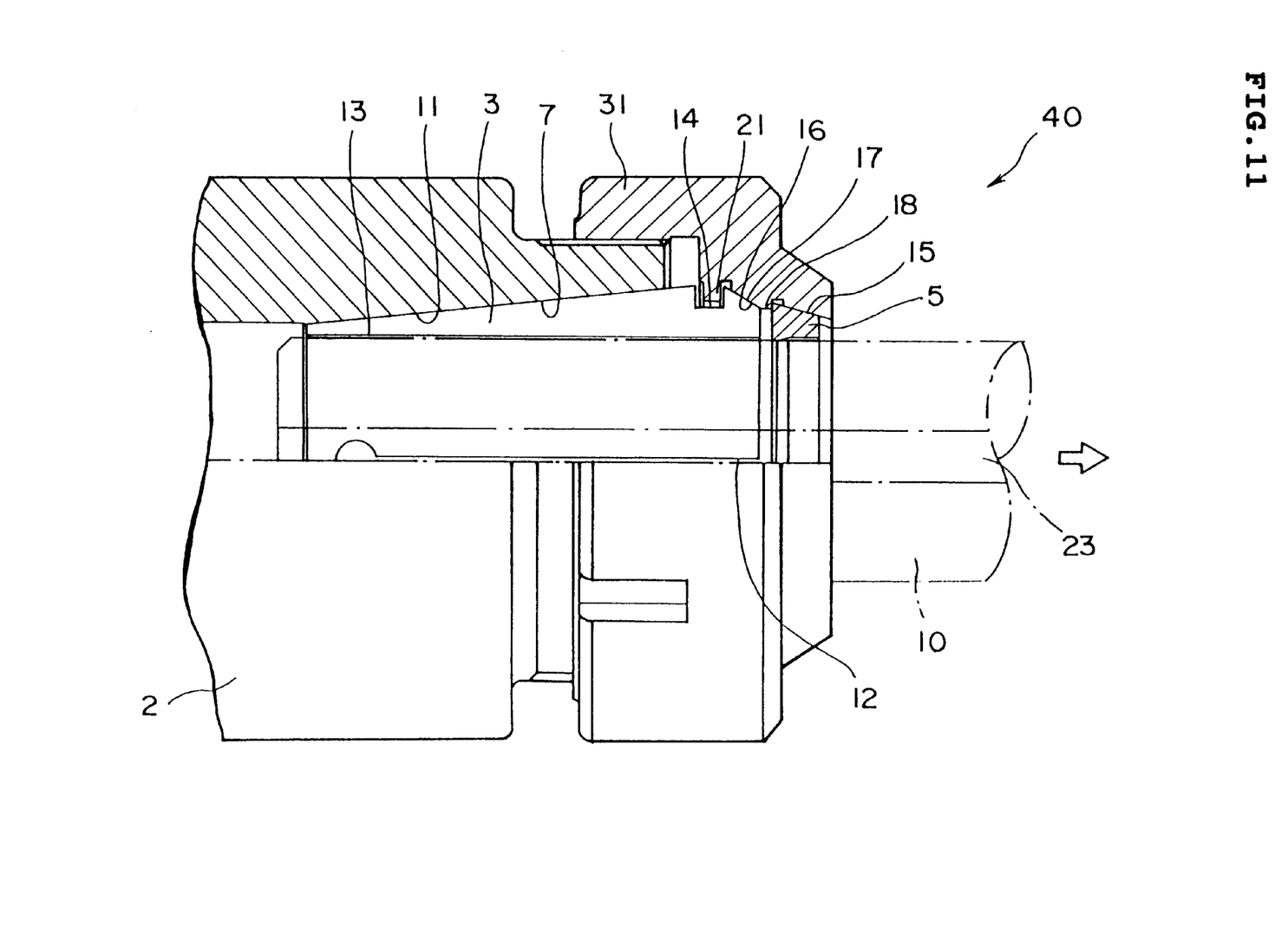
FIG. 11 is a partial sectional view of a tool holder according to Embodiment 4 of this invention.

FIG. 11 is a partial sectional view of a tool holder according to Embodiment 4. Concerning Embodiment 4, members similar to those described in Embodiment 1 are given the same reference numeral and descriptions thereof are omitted.

A tool holder 40 according to Embodiment 4 is different from the tool holder 1 according to Embodiment 1 in that the engaging member and the nut are integrally formed. Namely, a nut 31 of the tool holder 40 has an inclined face 15 formed at its top end portion on the inside peripheral surface thereof. On the base end side of this inclined face 15, a wall 18 projecting toward the shaft center is formed along the inside periphery. An inclined face 17 is formed on the base end side of the wall 18 and a convex engaging portion 21 is formed on the base end side of the inclined face 17 and projects toward the shaft center.

The inclined face 15, the wall 18, the inclined face 17 and the convex engaging portion 21 formed on the nut 31 show motions and advantages similar to those of Embodiment 1.

It is a matter of course that the tool holder 40 according to Embodiment 4 can present advantages similar to those in the aforementioned embodiments.

[Embodiment 5]

A needle lock chuck according to Embodiment 5 of this invention is hereinafter described with reference to the relevant drawing. Concerning Embodiment 5, members similar to those described in Embodiment 1 are given the same reference numeral and descriptions thereof are omitted.

Figure 12:
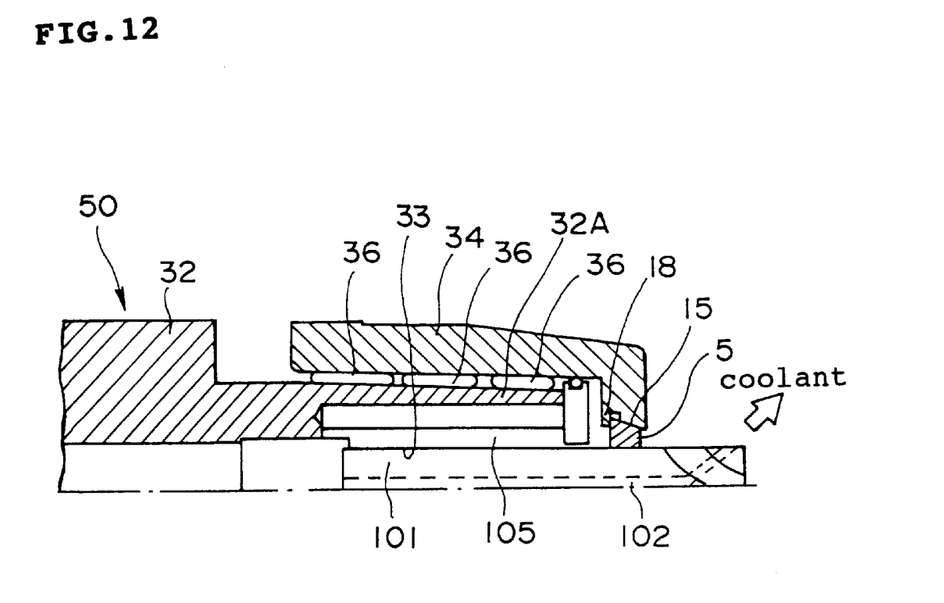
FIG. 12 is a sectional view of a needle lock chuck along the shaft center thereof according to Embodiment 5 of this invention.

FIG. 12 is a sectional view of a needle lock chuck along the shaft center thereof according to Embodiment 5.

A needle lock chuck 50 shown in FIG. 12 comprises: a holder body 32 comprising a tool receiving portion 33 therein; a nut 34 for fixing at the holder body 32 a tool 101 received by the holder body 32; and an elastic member 5 provided between the tool 101 received by the holder body 32 and the nut 34.

The nut 34 is composed of: a rotation ring 35 to be retained in a freely rotatable manner; and a plurality of needle rollers 36 incorporated into between the rotation ring 35 and a cylindrical portion 32A formed on the top end portion of the holder body 32.

The axis of each needle roller 36 is constructed in a manner such that it is slightly inclined in relation to the axis of the cylindrical portion 32A of the holder body 32. Moreover, an inclined face 15 similar to that of Embodiment 1 is formed on the inside peripheral surface of the top end portion of the nut 34. Furthermore, a wall 18 similar to that of Embodiment 1 is formed on the base end side of the inclined face 15.

Concerning the nut 34, when the rotation ring 35 is rotated in a desired direction, a radial force is applied to the cylindrical portion 32A through the needle rollers 36, causing the diameter of the tool receiving portion 33 to contract and thereby fixing the tool 101. Then, as in the case of Embodiment 1, the tool 101 and the elastic member 5 are securely sealed and the elastic member 5, the inclined face 15 and the wall 18 are securely sealed.

The tool 101 has a through hole 102 formed therein for letting a coolant pass through. This through hole 102 is formed at a central portion of the tool 101 along its shaft center through near the top end thereof, from which the through hole 102 branches obliquely toward outside. Moreover, the coolant is supplied to the elastic member 5 through a slit 105 at the inside periphery of the cylindrical portion 32A.

The needle lock chuck 50 shown in FIG. 12 has such a structure that the base end surface of the held tool 101 is caused to contact a stopper bolt provided within the holder body 32, and fastening of the nut 34 directly fastens and grips the tool 101 with the inside peripheral surface of the tool receiving portion 33. The method of gripping the tool 101 is not specifically shown in the drawing because it is publicly known.

It is a matter of course that the needle lock chuck 50 having the above-described structure can present advantages similar to those of the aforementioned embodiments.

Concerning Embodiment 5, an explanation has been given about the structure without using a collet. However, without limitation to such a structure, there is no doubt that this invention can be applied to a needle lock chuck which uses a collet.

[Embodiment 6]

A side lock holder according to Embodiment 6 of this invention is hereinafter described with reference to the relevant drawing. Concerning Embodiment 6, members similar to those described in Embodiment 1 are given the same reference numeral and descriptions thereof are omitted.

Figure 13:
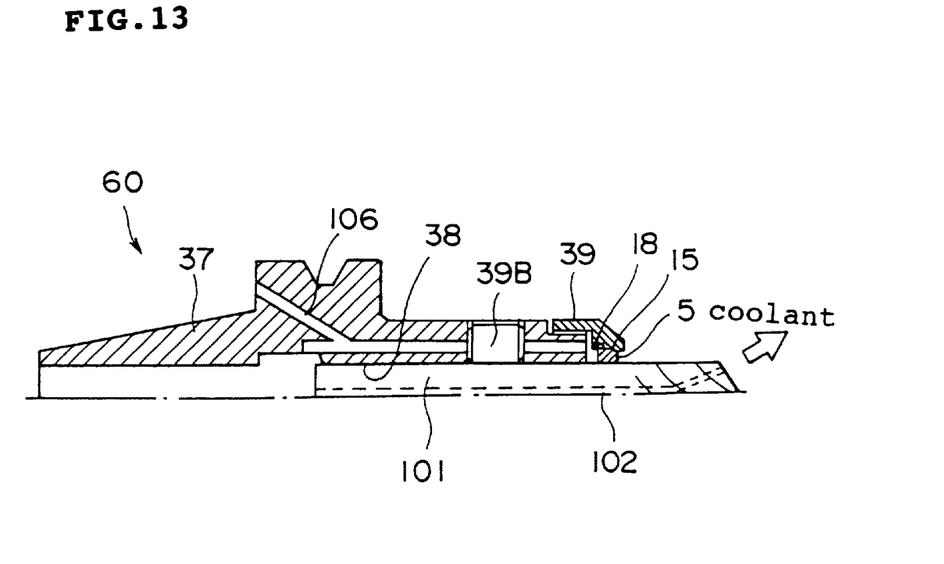
FIG. 13 is a sectional view of a side lock holder along the shaft center thereof according to Embodiment 6 of this invention.

FIG. 13 is a sectional view of a side lock holder along the shaft center thereof according to Embodiment 6.

A side lock holder 60 shown in FIG. 13 is a so-called "flange through type" and comprises: a holder body 37 comprising a tool receiving portion 38 and a coolant supply passage 106 therein; a nut 39 for fixing at the holder body 37 a tool 101 received by the holder body 37; and an elastic member 5 provided between the tool 101 received by the holder body 37 and the nut 39.

An inclined face 15 similar to that of Embodiment 1 is formed on the inside peripheral surface of the top end portion of the nut 39. Moreover, a wall 18 similar to that of Embodiment 1 is formed on the base end side of the inclined face 15. When the nut 39B is rotated in a desired direction, the tool 101 inserted into the top end portion of the holder body 37 is pressed against the opposite wall of the top end portion of the holder body 37, thereby fixing the tool 101 at the holder body 37. Then, just as in the case of Embodiment 1, the tool 101 and the elastic member 5 are securely sealed and the elastic member 5, the inclined face 15 and the wall 18 are securely sealed.

Concerning Embodiment 6, an explanation has been given about the structure without using a collet. However, without limitation to such a structure, there is no doubt that this invention can be applied to a side lock holder which uses a collet.

It is a matter of course that the side lock holder 60 having the above-described structure can present advantages similar to those of the aforementioned embodiments.

[Embodiment 7]

A morse taper holder according to Embodiment 7 of this invention is hereinafter described with reference to the relevant drawing. Concerning Embodiment 7, members similar to those described in Embodiment 1 are given the same reference numeral and descriptions thereof are omitted.

Figure 14:
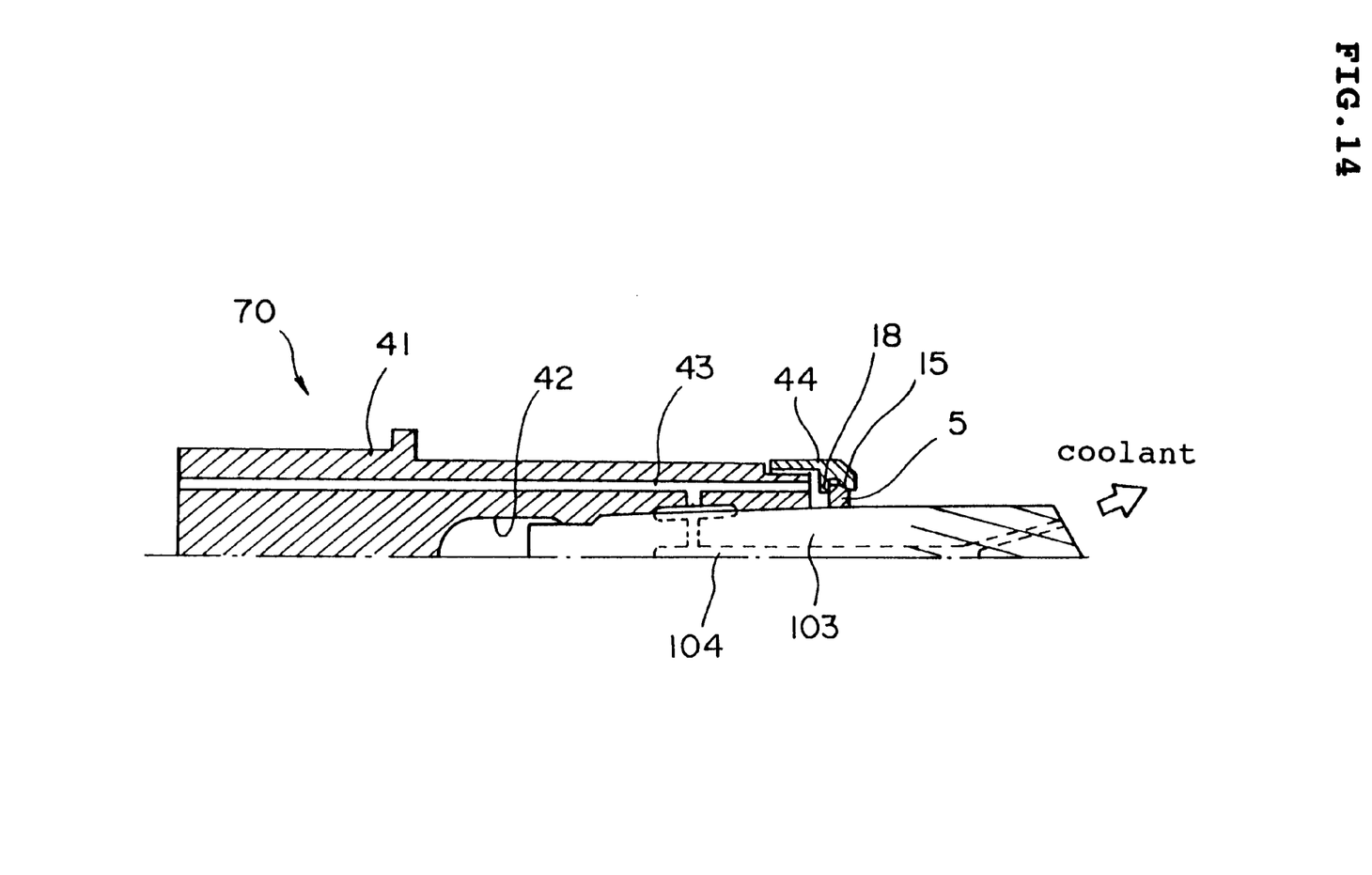
FIG. 14 is a sectional view of a morse taper holder along the shaft center thereof according to Embodiment 7 of this invention.

FIG. 14 is a sectional view of a morse taper holder along the shaft center thereof according to Embodiment 7.

A morse taper holder 70 shown in FIG. 14 comprises: a holder body 41 comprising a tool receiving portion 42 and a coolant supply passage 43 therein; a nut 44 for fixing at the holder body 41 a tool 103 received by the holder body 41; and an elastic member 5 provided between the tool 103 received by the holder body 41 and the nut 44.

The coolant supply passage 43 formed in the holder body 41 is structured to communicate with a coolant through hole 104 formed in the tool 103 as described later in detail.

An inclined face 15 similar to that of Embodiment 1 is formed on the inside peripheral surface of the top end portion of the nut 44. Moreover, a wall 18 similar to that of Embodiment 1 is formed on the base end side of the inclined face 15.

As the tool 103 is pushed hard into the holder body 41, a wedge effect will be produced, thereby fixing the tool 103 at the holder body 41.

When the nut 44 is rotated in a desired direction, a radial force is applied to the top end portion of the holder body 41, causing the diameter of the tool receiving portion 42 to contract and thereby fixing the tool 103. Then, just as in the case of Embodiment 1, the tool 103 and the elastic member 5 are securely sealed and the elastic member 5, the inclined face 15 and the wall 18 are securely sealed.

The portion of the tool 103 that is received by the tool receiving portion 38 is constructed to have a slightly larger diameter on the top end side than that on the base end side, and the diameter of the portion extending from the tool receiving portion 38 remains the same. The tool 103 has a coolant through hole 104 formed therein for letting a coolant pass through. This coolant through hole 104 communicates with the coolant supply hole 43 of the holder body 41.

Concerning Embodiment 7, an explanation has been given about the structure without using a collet. However, without limitation to such a structure, there is no doubt that this invention can be applied to a morse taper holder which uses a collet.

Moreover, it is a matter of course that the morse taper holder 70 having the above-described structure can present advantages similar to those of the aforementioned embodiments.

As described above, the tool holder according to this invention has such a structure that it comprises: an engaging member comprising an inclined face which makes the inside diameter smaller toward the top end of the held tool; and an elastic member provided between the inclined face and the outside periphery of the tool. Accordingly, when pressure of a supplied fluid moves the elastic member toward the top end side of the tool, the elastic member is pressed relatively in its shaft center direction because of the existence of the inclined face and is then caused to contract. As a result, it is possible to make the elastic member closely contact the tool and also the engaging member. Since this effect improves as the pressure of the fluid becomes higher, it is possible to realize superior sealability even when the fluid of high pressure is supplied. Moreover, there is also an advantage that even if the diameter of a tool to be held varies, high sealability can be obtained because of the movement of the elastic member. Furthermore, as the sealability of the supplied fluid increases, the sealability against infiltration of foreign materials from outside increases simultaneously.

What is claimed is:

1. A tool holder for holding a tool and for supplying to said held tool a fluid passing within a holder body from its base end side toward its top end side, comprising:

an engaging member provided on the top end side of a tool holding portion of the holder body and comprising an inclined face constructed in a manner such that an inside diameter becomes smaller toward the top end of said held tool; and a stopper provided between said inclined face and the outside periphery of said held tool.

2. A tool holder according to claim 1, wherein said stopper is composed of an elastic member.

3. A tool holder according to claim 1, wherein said stopper is in a shape complementary to said inclinded face and the outside periphery of said tool.

4. A tool holder according to claim 1, wherein said stopper has an end face that receives pressure from said fluid, said end face being formed in a convex shape.

5. A tool holder according to claim 1, wherein said stopper has an end face that receives pressure from said fluid, said end face being formed in a concave shape.

6. A tool holder according to claim 1, wherein said stopper has an insider diameter on the side receiving pressure from said fluid that is smaller than an inside diameter on the top end side of said tool.

7. A tool holder according to claim 6, wherein said stopper includes an inside peripheral surface, and a fold is provided on said inside peripheral surface in a manner such that the inside diameter of said stopper becomes smaller toward the side receiving pressure from said fluid.

8. A tool holder according to claim 7, wherein a plurality of said folds are provided on the inside peripheral surface of said stopper.

9. A tool holder according to claim 8, wherein the plurality of said folds includes a fold on the top end side of said tool that is provided in a manner such that the inside diameter of said stopper becomes smaller toward the top end side of said tool.

10. A tool holder according to claim 1, wherein a supply passage for supplying said fluid is provided in said stopper which pierces from the side receiving pressure from said fluid through the top end side of the tool.

11. A tool holder according to claim 10, wherein said supply passage is composed of a groove provided at a desired position on the inside peripheral surface of said stopper.

12. A tool holder according to claim 10, wherein said supply passage is formed between the inside peripheral surface of said stopper and an outside peripheral surface thereof.

13. A tool holder according to claim 1, wherein a wall capable of engaging with said stopper is provided on the inside peripheral surface of said engaging member on the holder body side.

14. A tool holder according to claim 1, wherein said engaging member is separable from said holder body.

15. A tool holder according to claim 1, wherein said engaging member is provided on a nut for fastening and fixing said tool at said holder body.

16. A tool holder according to claim 15, wherein said engaging member is provided on a nut for a collet chuck.

17. A tool holder according to claim 15, wherein said engaging member is provided on a nut for a needle lock chuck.

18. A tool holder according to claim 15, wherein said engaging member is provided on a nut for a side lock holder.

19. A tool holder according to claim 15, wherein said engaging member is provided on a nut for a morse taper holder.

* * * * *